(12) United States Patent
Okajima

(10) Patent No.: US 6,181,477 B1
(45) Date of Patent: Jan. 30, 2001

(54) IMAGING LENS

(75) Inventor: Koji Okajima, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/354,451

(22) Filed: Jul. 15, 1999

(30) Foreign Application Priority Data

Jul. 17, 1998 (JP) .................................................. 10-203445

(51) Int. Cl.$^7$ .............................. G02B 3/00; G02B 13/04
(52) U.S. Cl. ........................ 359/642; 359/749; 359/750; 359/751
(58) Field of Search .................................... 359/749, 735, 359/642

(56) References Cited

U.S. PATENT DOCUMENTS 5,812,326 * 9/1998 Yamada ................................. 359/749
5,999,324 * 12/1999 Kohno ................................. 359/618

* cited by examiner

Primary Examiner—Georgia Epps
Assistant Examiner—Michael A. Lucas
(74) Attorney, Agent, or Firm—Frommer Lawrence & Haug, LLP.; William S. Frommer; Gordon Kessler

(57) ABSTRACT

In an imaging lens unit configured of two lenses, the deterioration of the optical performance due to the eccentricity is suppressed for an improved assembling property, while at the same time correcting the various aberrations in satisfactory manner. A meniscus first lens (L1) having a weak refracting power, and a meniscus second lens (L2) having positive refracting power with the convex surface thereof directed toward the image surface are arranged sequentially from the object side toward the image surface (IMG). The conditions $f2/f>0.9$ and $nd2>1.55$ are met, where f is the focal length of the whole lens system, f2 the focal length of the second lens, and nd2 the refractive index on the d line of the second lens.

6 Claims, 18 Drawing Sheets

Fno.=2.84

ω=28.8°

ω=32°

Fno.=3.00

IMAGING LENS

BACKGROUND OF THE INVENTION

1. Field of the Invention

The present invention relates to a small-sized imaging lens which improves the assembling property without deteriorating the performance thereof.

2. Description of the Related Art

A conventional small-sized imaging lens has been designed for use with a simple camera in the form of what is called a film with a lens. Japanese Unexamined Patent Publication Nos. 4-211215, 5-281465 and 6-258574, for example, disclose an imaging lens configured of two pieces of lenses.

Also, other applications of the imaging lens having two lenses as described in the above-mentioned publications include those described in Patent Publication No. 8-5910 used for a read optical system such as a facsimile and Patent Publication No. 5-341185 for the endoscope.

By the way, the conventional small-sized imaging lenses described above have the following problems.

Specifically, the imaging lenses described in Patent Publication Nos. 4-211215 and 5-281465, in which the image surface is corrected by the curving of the surface of a silver salt film providing a photosensitive material and the open F-number is as dark as about 9 to 11, is not suitable as an imaging lens for an image-pickup equipment using an imaging device (hereinafter called the CCD) in place of the silver salt film.

The imaging lens described in Patent Publication Nos. 6-258574 and 8-5910 is what is called of the telephoto type configured of a lens having a positive refracting power and a lens having a negative refracting power sequentially from the object side in order to reduce the size. Therefore, the angle of the emitted light ray is so large that a color shift is caused by the use of the CCD as a photosensitive member. Further, it is difficult to secure a space for filters for cutting the infrared light and a low-pass filter essential to the image-pickup equipment using the CCD.

Also, the imaging lens described in Patent Publication No. 5-341185 designed for the endoscope is configured of lenses having a negative refracting power and a positive refracting power arranged sequentially from the object side. An iris is arranged between these lenses and the CCD is used as a photosensitive member. Nevertheless, the distortion is caused by the asymmetric arrangement of refractive power with respect to the iris, and the eccentricity of the two lenses deteriorates the optical performance, thus requiring a high assembly accuracy.

SUMMARY OF THE INVENTION

Accordingly, an object of the present invention is to provide an imaging lens of two-lens configuration, in which the deterioration of the optical performance due to the eccentricity is suppressed for improving the assembling property, while at the same time making possible the correction of various aberrations satisfactorily.

Another object of the invention is to provide an small-sized imaging device configured of two lenses in which the deterioration of the optical performance is suppressed as described above.

In order to solve the problems described above, an imaging lens system according to this invention comprises, as arranged from the object side toward the image surface, a first lens in the shape of meniscus having a weak refracting power and a second lens having a positive refracting power in the shape of meniscus with the convex surface thereof faced to the image surface side, wherein the conditions f2/f>0.9, nd2>1.55 are satisfied, where f is the focal length of the whole lens system, f2 the focal length of the second lens and nd2 the refractive index of the second lens on the d line, respectively.

Thus, a small-sized imaging lens can be configured of two lenses with the distortion corrected in proper way by two lenses.

DETAILED DESCRIPTION OF THE PREFERRED EMBODIMENTS

Figure 1:
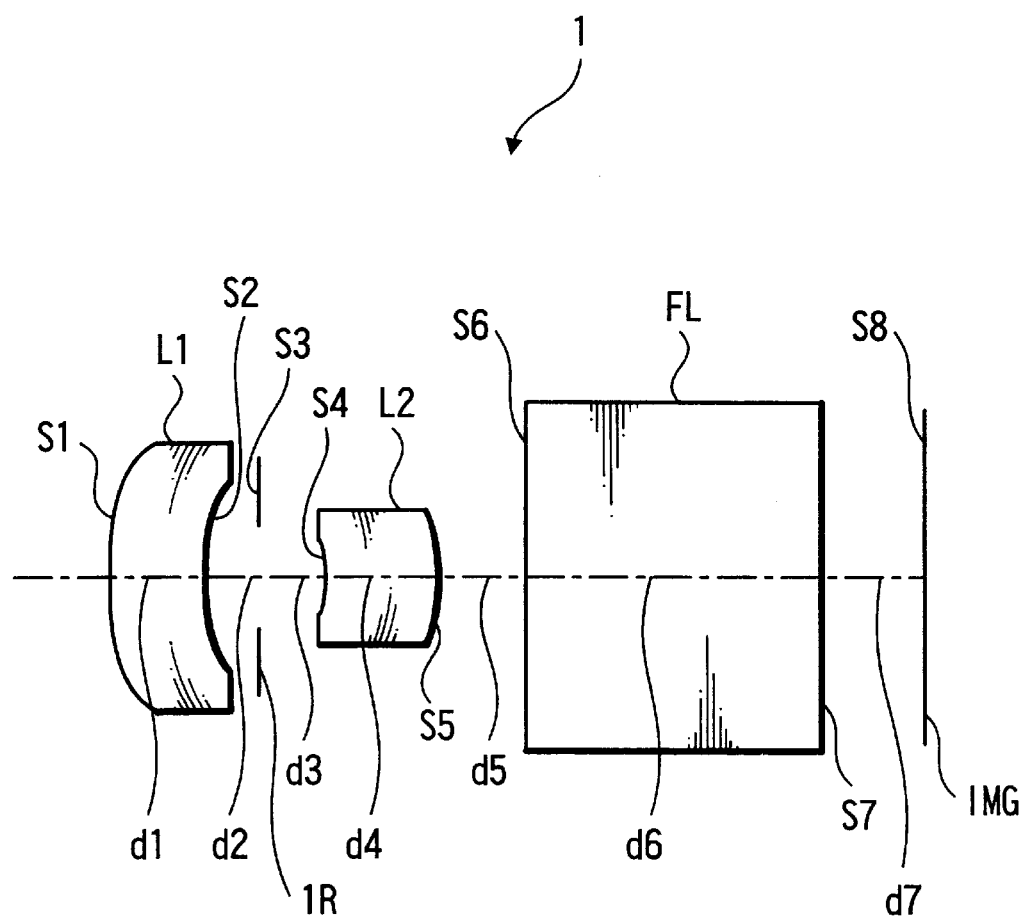
FIG. 1 is a diagram schematically showing, together with FIGS. 2 to 4, an imaging lens according to a first embodiment of the invention, the diagram schematically showing a lens configuration.

An imaging lens according to embodiments of the invention will be described below with reference to the accompanying drawings. FIGS. 1 to 4 show a first embodiment 1, FIGS. 5 to 8 a second embodiment 1A, FIGS. 9 to 12 a third embodiment 1B, FIGS. 13 to 16 a fourth embodiment 1C, and FIGS. 17 to 20 a fifth embodiment 1D, respectively.

First, common facts of the respective embodiments will be explained.

In the description that follows, "Si" designates the ith plane as counted from the object side, "Ri" the radius of curvature of the plane Si, "di" the interval on the optical axis between the plane Si and the plane Si+1, "ndi" the refractive index on the d line of the ith lens (nd3 indicates a filter), "υdi" the Abbe's number on the d line of the ith lens (υd3 indicates a filter), "f" the focal length of the whole lens system, "Fno." the open F-number, and "ω" the half field angle.

Also, the aspherical shape of the lens surface is defined as $$Z=(H^2/r)/[1+\sqrt{(1-\{K+1\}\cdot\{H/r\}^2)}]+A4\cdot H^4+A6\cdot H^6+A8\cdot H^8+A10\cdot H^{10}$$

In the foregoing equation, "Z" is the distance along the optical axis from the nodal plane of the lens top at an arbitrary point on the lens surface, "r" the radius of curvature, "H" the distance from the optical axis (H= $\sqrt{\{X^2+Y^2\}}$), and "K" the conical constant, respectively. Also, A4, A6, A8 and A10 are aspherical factors on the fourth, sixth, eighth and tenth order, respectively.

The imaging lenses 1, 1A, 1B, 1C and 1D according to the first to fifth embodiments, as shown in FIGS. 1, 5, 9, 13 and 17, respectively, include a lens system configured of, from the object side toward the image surface side, a first lens L1 in the shape of meniscus having a weak refracting power and a second lens L2 in the shape of meniscus having a positive refracting power with the convex surface thereof directed toward the image surface side. A stop IR is arranged between the first lens L1 and the second lens L2, and a filter FL is interposed between the second lens L2 and the image surface (imaging surface) IMG.

Also, the imaging lenses 1, 1A, 1B, 1C and 1D satisfy the relation f2/f>0.9 (hereinafter referred to as the conditional equation 1) and the relation nd2>1.55 (hereinafter referred to as the conditional equation 2), where f2 is the focal length of the second lens L2 and nd2 the refractive index on the d line of the second lens L2.

Further, the relation |f1/f|>3.5 (hereinafter referred to as the conditional equation 3), the relation 0.2<d1/f<0.35 (hereinafter referred to as the conditional equation 4) and the relation 0.65<|exp/l| (hereinafter referred to as the conditional equation 5) are satisfied, where f1 is the focal length of the first lens L1, d1 the thickness of the central portion of the first lens L1, exp the distance from the image surface IMG to the exit pupil, and l the distance from the top of the surface S1 on the object side of the first lens L1 to the image surface IMG.

Now, each conditional equation will be explained.

The conditional equation 1 is for limiting the refracting power of the second lens L2, and when the value f2/f is out of the range defined by the conditional equation 1 (0.9 or less), it is difficult to secure a sufficient value of back focus for arranging the filter FL between the second lens L2 and the image surface IMG.

By the way, in the case where the refracting power of the first lens L1 is changed to the negative side in order to secure a sufficient back focus when the value f2/f is out of the range defined by the conditional equation 1, the first lens L1 and the second lens L2 are configured to have a negative and a positive asymmetric arrangement with respect to the iris IR therebetween, resulting in an increased distortion.

Specifically, the radius of curvature r4 of the surface S4 of the second lens on the image surface side is preferably to be r4>1.

The conditional equation 2 is for defining the shape of the second lens L2, and when the refracting index on the d line of the second lens L2 becomes 1.55 or less, the second lens L2 cannot maintain the shape of meniscus and the both surfaces become convex, so that the back focus of the whole lens system becomes short, while at the same time increasing the sensitivity to the eccentricity. Further, the increased Petzval's sum increases the astigmatism, with the result that the balance of the astigmatism on the sagittal image surface and the meridional image surface cannot be maintained.

The conditional equation 3 is for defining the peripheral shape of the first lens L1.

Specifically, the first lens L1 is for correcting the distortion and the coma flare of the peripheral light fluxes (lower light rays). In the case where the refracting power is large, however, the coma flare is generated increasingly, so that the aspherical shape for correcting it becomes complicated. Once the aspherical shape has become complicated, the lens surface becomes difficult to machine and the sensitivity to the eccentricity increases at the time of assembly.

The conditional equation 4 is for limiting the thickness of the central portion of the first lens L1. When the value d1/f decreases to 0.2 or less, the strength of the first lens L1 runs short and a stable surface shape cannot be maintained. If the value d1/f increases to 0.35 or more, on the other hand, the first lens L1 increases in size, and at the same time, the effect of the high-order aspherical term is required to be increased for correcting the aberration of the peripheral light fluxes. Also, the flare is caused by the eccentricity often leading to the deterioration of the image-forming performance.

The conditional equation 5 is for limiting the distance of the exit pupil from the image surface IMG, and when the value |exp/l| decreases to 0.65 or less, the inclination of the light fluxes emitted to the CCD increases to such an extent that the light amount in the peripheral portion of the light-receiving surface of the CCD is conspicuously reduced.

Now, each embodiment will be described in detail. In the embodiments, Ri is the radius of curvature in mm unit of the surface Si, di the inter-surface path height difference in mm unit between the surface Si and the surface Si+1 on the optical axis, ndi the refractive index on the d line of each optical member (lens), and υdi the Abbe's number.

Table 1 shows each value of the imaging lens 1 according to the first embodiment.

TABLE 1

| i | Ri | di | ndi | υdi |
|---|---|---|---|---|
| 1 | 9.520 | 0.70 | 1.80610 | 40.9 |
| 2 | 7.957 | 0.40 | | |
| 3 | stop | 0.49 | | |
| 4 | −3.653 | 0.85 | 1.80610 | 40.9 |
| 5 | −1.500 | 0.70 | | |
| 6 | ∞ | 2.34 | 1.51680 | 64.2 |
| 7 | ∞ | 0.80 | | |
| 8 | Image surface | | | |

Table 2 shows the fourth-, sixth-, eighth- and tenth-order aspherical coefficients A4, A6, A8 and A10 for the surfaces S1, S2, S4 and S5, respectively, formed of aspherical surfaces.

TABLE 2

| Si | K | A4 | A6 | A8 | A10 |
|---|---|---|---|---|---|
| S1 | 0 | 6.29638E-0.2 | 1.47271E-02 | -3.55633E-03 | 3.13352E-03 |
| S2 | 0 | 1.37695E-01 | 1.45357E-01 | -1.13795E-01 | 2.43694E-01 |
| S4 | 0 | -3.00000E-02 | 1.10000 | -6.00000 | 1.03000E+01 |
| S5 | 0 | 3.82467E-02 | -1.31965E-01 | 4.84674E-01 | -5.66558E-01 |

In Table 2, "E" means the exponential expression with 10 as the base (the same applies to Tables 5, 8 and 11 described later).

Table 3 shows the value of each conditional equation and each value of f, Fno. and ω of the imaging lens 1.

TABLE 3

| | |
|---|---|
| f2/f | 0.95 |
| nd2 | 1.80610 |
| |f1/f| | 26.7 |
| d1/f | 0.250 |
| |exp/1| | 0.685 |
| f | 2.80 |
| Fno. | 2.84 |
| ω | 28.8 |

Figure 2:
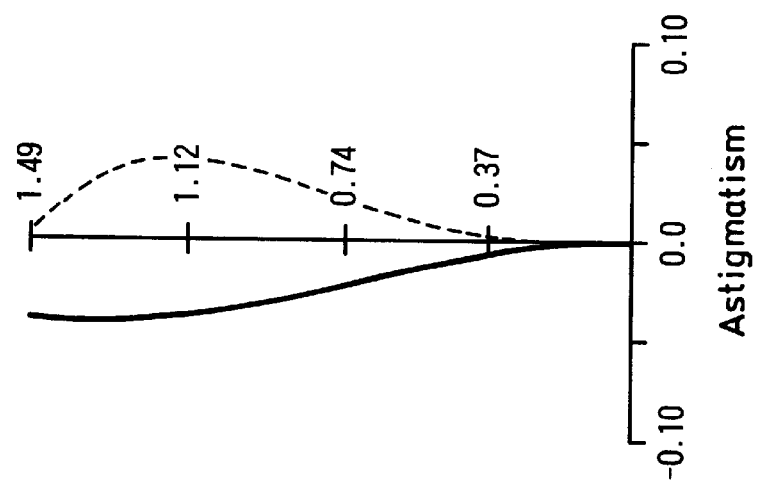
FIG. 2 is a spherical aberration diagram.
Figure 3:
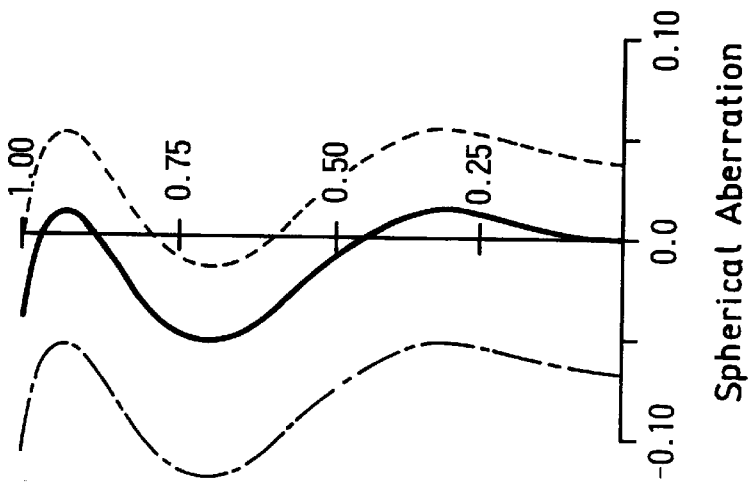
FIG. 3 is an astigmatism diagram.
Figure 4:
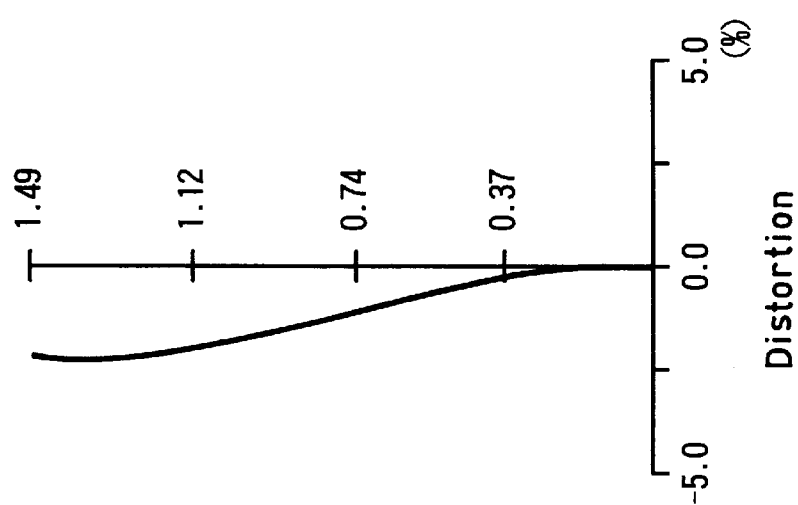
FIG. 4 is a distortion diagram.
Figure 5:
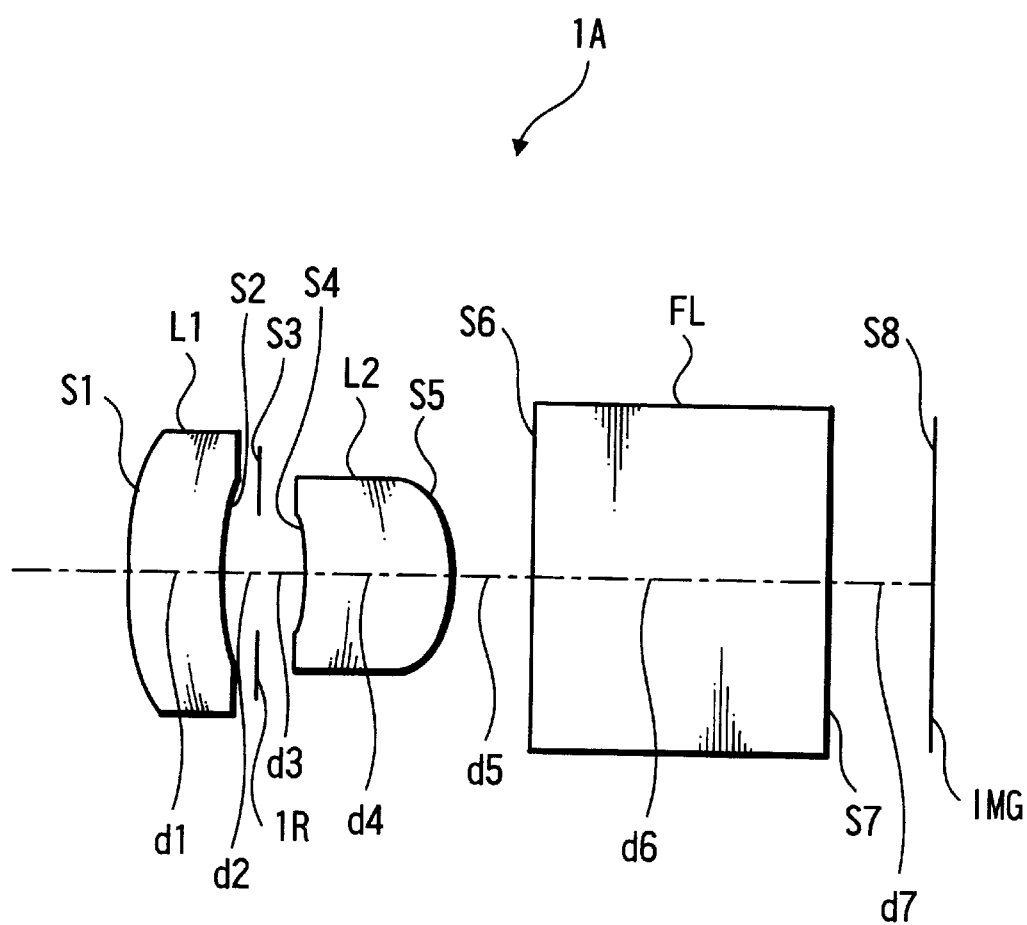
FIG. 5 is a diagram schematically showing, together with FIGS. 6 to 8, an imaging lens according to a second embodiment of the invention, the diagram schematically showing a lens configuration.

FIGS. 2 to 4 show a spherical aberration diagram, an astigmatism diagram and a distortion diagram for the imaging lens 1. Also, in the spherical aberration diagram, the solid line indicates the value for the e line (wavelength 546.1 nm), the dashed line the value for the C line (wavelength 656.3 nm) and the one-dot chain line the value for the g line (wavelength 435.8 nm), respectively. In the astigmatism diagram, the solid line represents the value for the sagittal image surface, and the dashed line the value for the meridional image surface, respectively.

Table 4 shows the values for the imaging lens 1A according to the second embodiment.

TABLE 4

| i | Ri | di | ndi | υdi |
|---|---|---|---|---|
| 1 | 3.259 | 0.70 | 1.80610 | 40.9 |
| 2 | 4.187 | 0.25 | | |
| 3 | stop | 0.37 | | |
| 4 | -1.862 | 1.14 | 1.71300 | 53.8 |
| 5 | -1.200 | 0.64 | | |
| 6 | ∞ | 2.34 | 1.51680 | 64.2 |
| 7 | ∞ | 0.70 | | |
| 8 | Image surface | | | |

Table 5 shows the fourth-, sixth-, eighth- and tenth-order non-spherical coefficients A4, A6, A8 and A10 for the surfaces S1, S2, S4 and S5, respectively, configured of a non-spherical surface.

TABLE 5

| Si | K | A4 | A6 | A8 | A10 |
|---|---|---|---|---|---|
| S1 | 0 | 5.65682E-02 | -4.34670E-02 | 6.12345E-02 | -2.41562E-02 |
| S2 | 0 | 1.21056E-01 | -2.33749E-01 | 5.80000E-01 | -5.23491E-01 |
| S4 | 0 | -2.54885E-01 | 1.14087 | -6.49698 | 1.01318E+01 |
| S5 | 0 | 3.08026E-02 | -1.15545E-01 | 3.12976E-01 | -2.96686E-01 |

Table 6 shows the value of each conditional equation and values f, Fno. and ω for the imaging lens 1A.

TABLE 6

| | |
|---|---|
| f2/f | 0.98 |
| nd2 | 1.71300 |
| |f1/f| | 4.8 |
| d1/f | 0.250 |
| |exp/1| | 0.748 |
| f | 2.80 |
| Fno. | 2.45 |
| ω | 28.4 |

Figure 6:
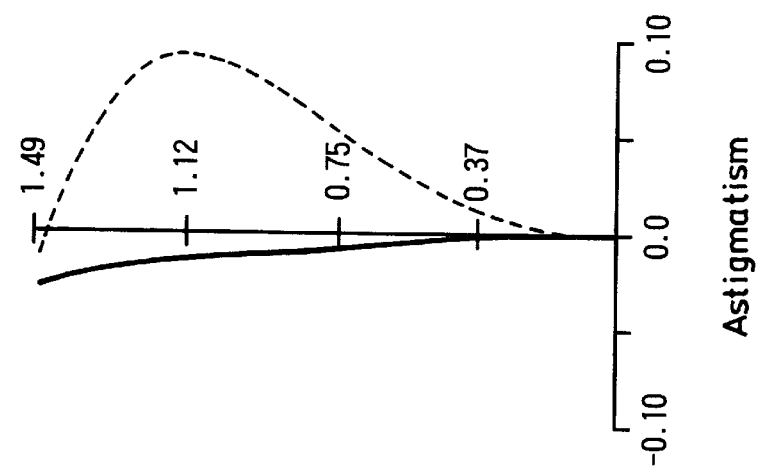
FIG. 6 is a spherical aberration diagram.
Figure 7:
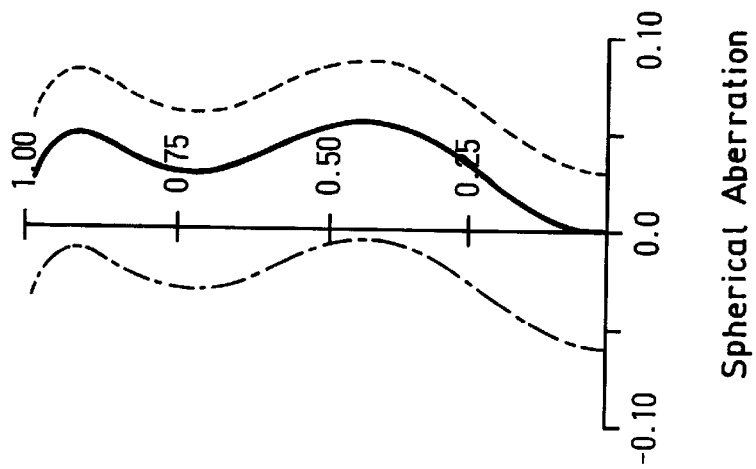
FIG. 7 is an astigmatism diagram.
Figure 8:
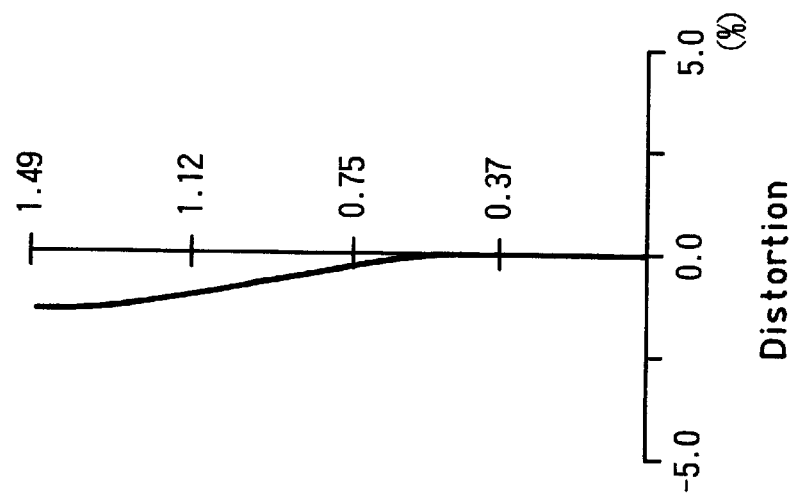
FIG. 8 is a distortion diagram.
Figure 9:
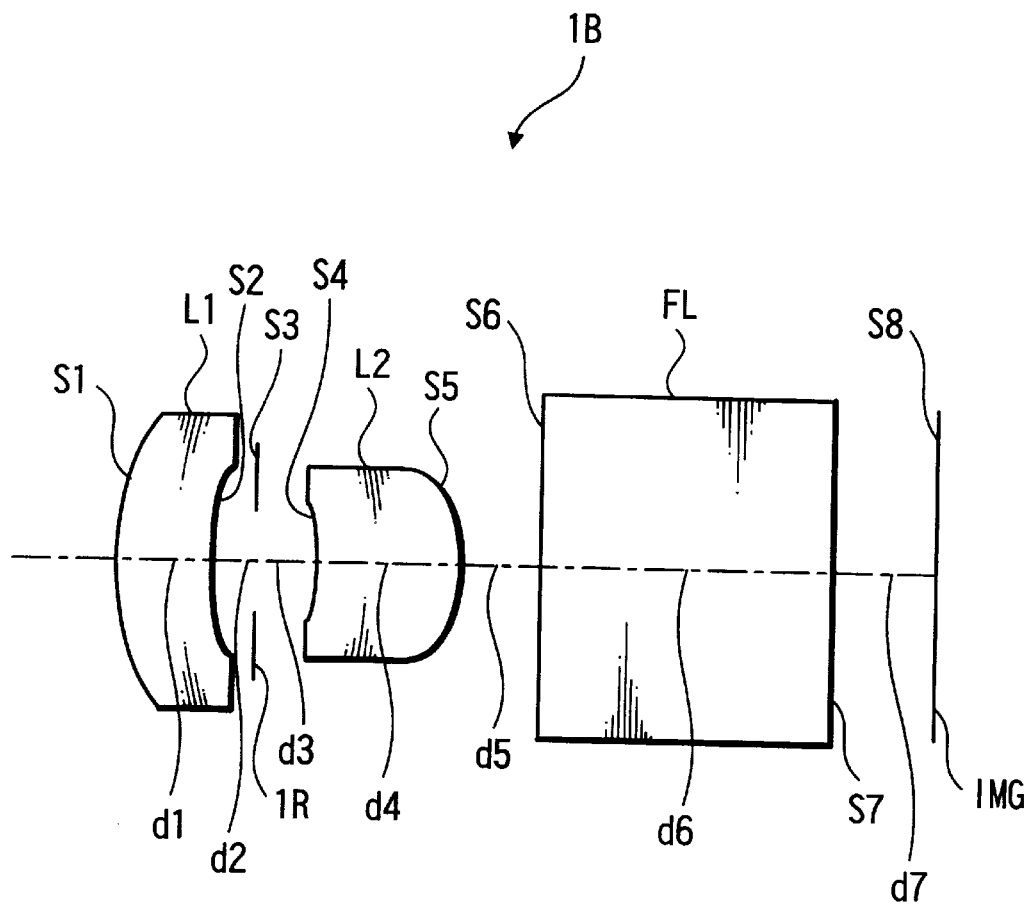
FIG. 9 is a diagram schematically showing, together with FIGS. 10 to 12, an imaging lens according to a third embodiment of the invention, the diagram schematically showing a lens configuration.

FIGS. 6 to 8 show a spherical aberration diagram, an astigmatism diagram and a distortion diagram for the imaging lens 1A. Also, in the spherical aberration diagram, the solid line represents the value for the e line, the dashed line the value for the C line and the one-dot chain line the value for the g line. In the astigmatism diagram, the solid line represents the value for the sagittal image surface, and the dashed line the value for the meridional image surface, respectively.

Table 7 shows the values for the imaging lens 1B according to the third embodiment.

TABLE 7

| i | Ri | di | ndi | υdi |
|---|---|---|---|---|
| 1 | 6.140 | 0.70 | 1.80610 | 40.9 |
| 2 | 4.722 | 0.33 | | |
| 3 | stop | 0.46 | | |
| 4 | -2.695 | 1.08 | 1.71300 | 53.8 |
| 5 | -1.200 | 0.62 | | |
| 6 | ∞ | 2.34 | 1.51680 | 64.2 |
| 7 | ∞ | 0.73 | | |
| 8 | Image surface | | | |

Table 8 shows the fourth-, sixth-, eighth- and tenth-order non-spherical coefficients A4, A6, A8 and A10 for the faces S1, S2, S4 and S5, respectively, configured of a non-spherical surface.

TABLE 8

| Si | K | A4 | A6 | A8 | A10 |
|---|---|---|---|---|---|
| S1 | 0 | 8.52011E-02 | -3.38570E-02 | 3.29758E-02 | -6.42900E-03 |
| S2 | 0 | 2.00909E-01 | -1.69322E-01 | 4.45012E-01 | -1.50427E-01 |
| S4 | 0 | -1.27562E-01 | 3.18856E-01 | -2.00083 | 2.86738 |
| S5 | 0 | 1.32522E-02 | 3.73996E-02 | -7.65258E-02 | 5.76368E-02 |

Table 9 shows the value of each conditional equation and the values f, Fno. and ω for the imaging lens 1A.

TABLE 9

| | |
|---|---|
| f2/f | 0.93 |
| nd2 | 1.71300 |
| |f1/f| | 12.9 |
| d1/f | 0.280 |
| |exp/1| | 0.715 |
| f | 2.50 |
| Fno. | 2.45 |
| ω | 31.4 |

Figure 10:
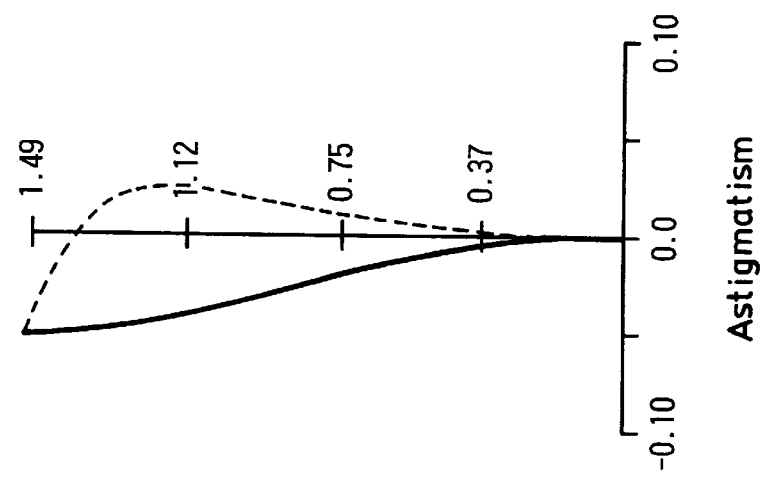
FIG. 10 is a spherical aberration diagram.
Figure 11:
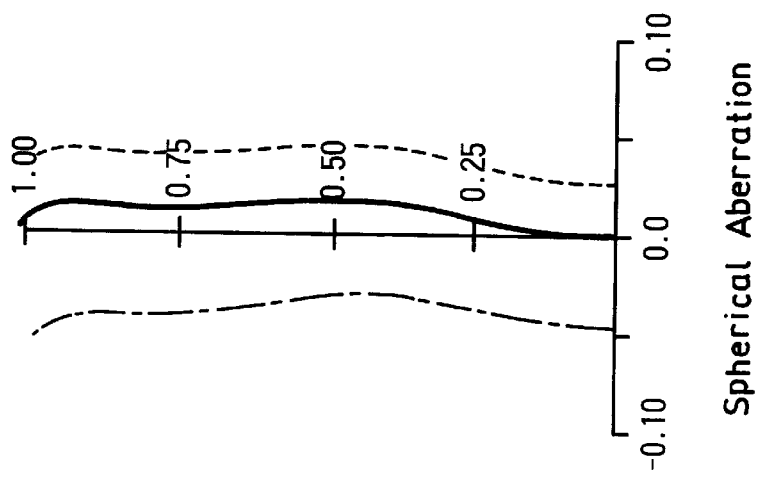
FIG. 11 is an astigmatism diagram.
Figure 12:
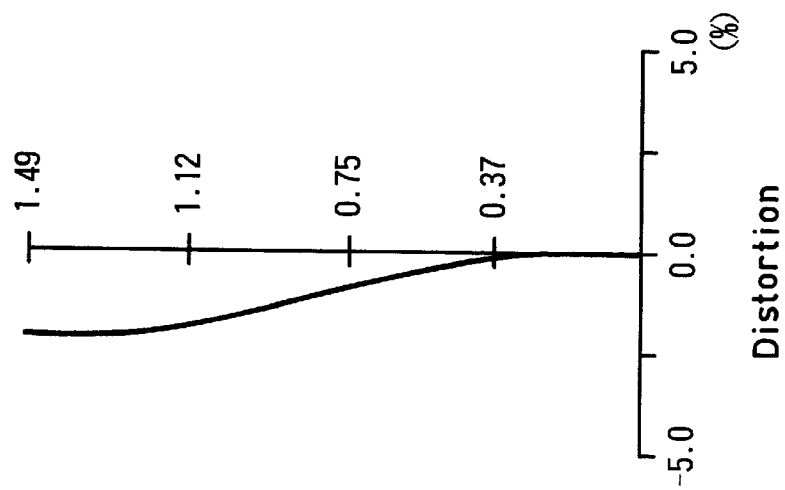
FIG. 12 is a distortion diagram.
Figure 13:
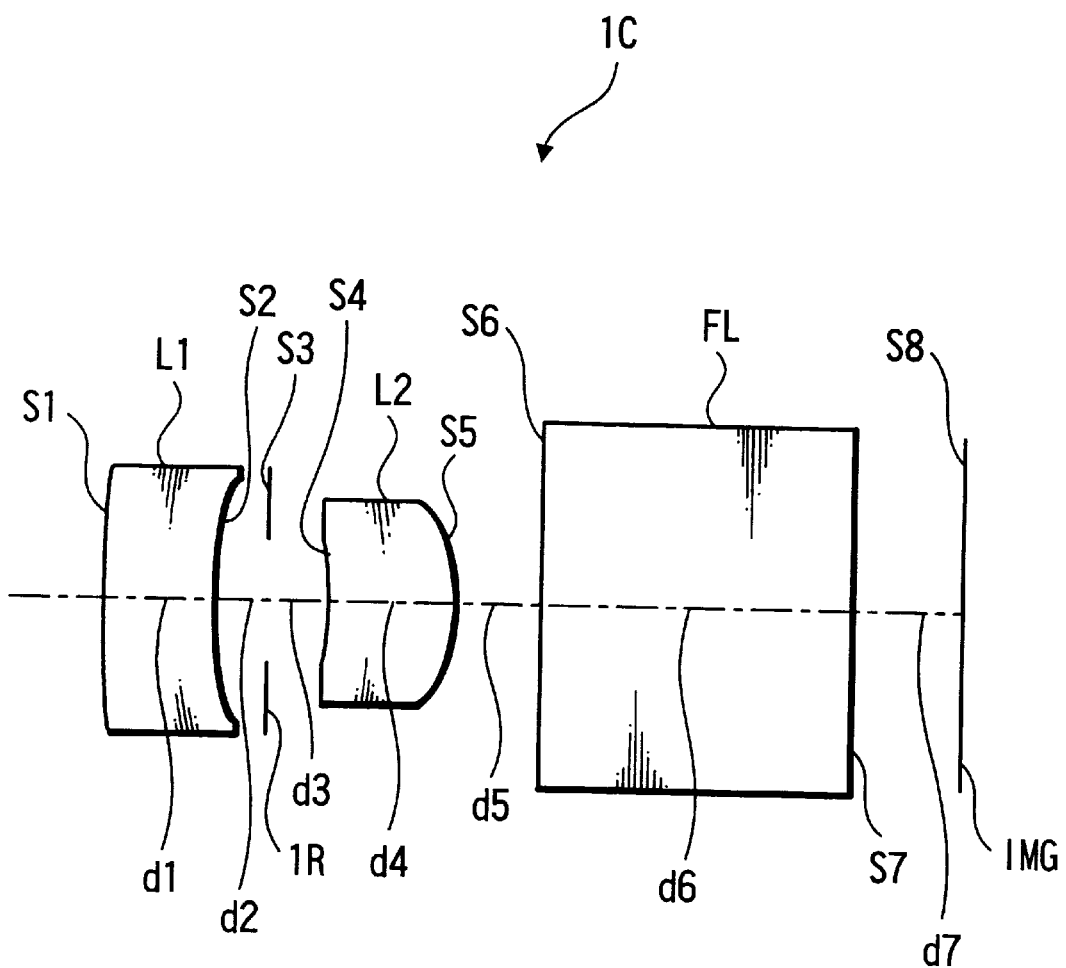
FIG. 13 is a diagram schematically showing, together with FIGS. 14 to 16, an imaging lens according to a fourth embodiment of the invention, the diagram schematically showing a lens configuration.

FIGS. 10 to 12 show a spherical aberration diagram, an astigmatism diagram and a distortion diagram for the imaging lens 1B. Also, in the spherical aberration diagram, the solid line represents the value for the e line, the dashed line the value for the C line and the one-dot chain the value for the g line, respectively. In the astigmatism diagram, the solid line represents the value for the sagittal image surface, and the dashed line the value for the meridional image surface, respectively.

Table 10 shows the values for the imaging lens 1C according to the fourth embodiment.

TABLE 10

| i | Ri | di | ndi | vdi |
|---|------|------|---------|------|
| 1 | −6.120 | 0.70 | 1.80610 | 40.9 |
| 2 | −8.202 | 0.40 | | |
| 3 | stop | 0.38 | | |
| 4 | −4.972 | 0.91 | 1.58913 | 61.2 |
| 5 | −1.200 | 0.42 | | |
| 6 | ∞ | 2.34 | 1.51680 | 64.2 |
| 7 | ∞ | 0.83 | | |
| 8 | Image surface | | | |

Table 11 shows the fourth-, sixth-, eighth- and tenth-order non-spherical coefficients A4, A6, A8 and A10 for the faces S1, S2, S4 and S5, respectively, configured of a non-spherical surface. +

TABLE 11

| Si | K | A4 | A6 | A8 | A10 |
|----|---|----|----|----|-----|
| S1 | 0 | 1.70974E−01 | −8.51563E−02 | 5.20915E−02 | −1.19933E−02 |
| S2 | 0 | 2.83341E−01 | −9.10967E−02 | 1.60000E−01 | 2.74470E−02 |
| S4 | 0 | 1.24459E−01 | −1.32952 | 7.61457 | −1.29157E+01 |
| S5 | 0 | 1.01500E−01 | −5.07797E−01 | 2.47788 | −3.43260 |

Table 12 shows the value of each conditional equation the values f, Fno. and ω for the imaging lens 1C.

TABLE 12

| f2/f | 1.02 |
|------|------|
| nd2 | 1.58913 |
| |f1/f| | 14.6 |
| d1/f | 0.292 |
| |exp/l| | 0.693 |
| f | 2.40 |
| Fno. | 3.00 |
| ω | 32.0 |

Figure 15:
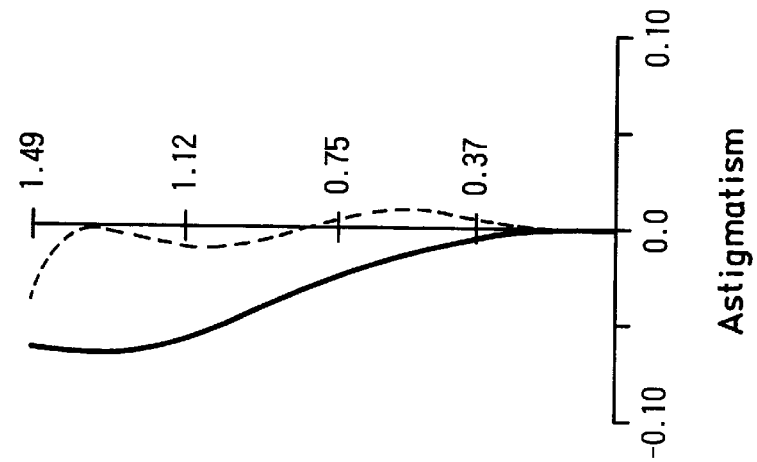
FIG. 15 is an astigmatism diagram.
Figure 14:
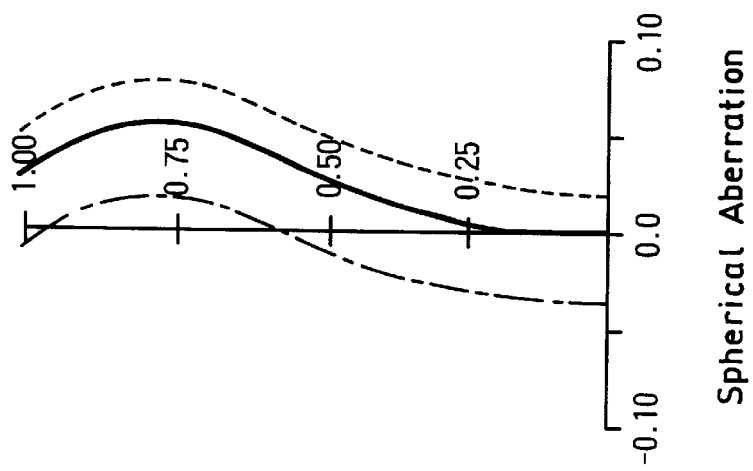
FIG. 14 is a spherical aberration diagram.
Figure 16:
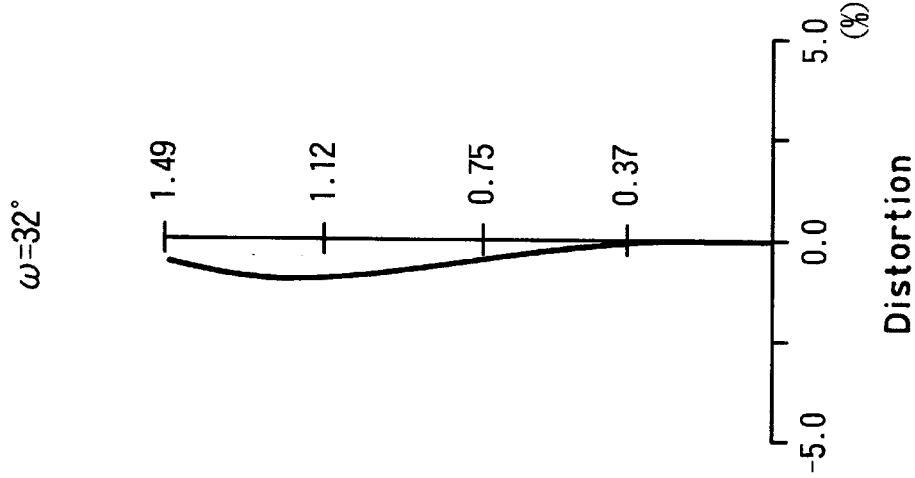
FIG. 16 is a distortion diagram.
Figure 17:
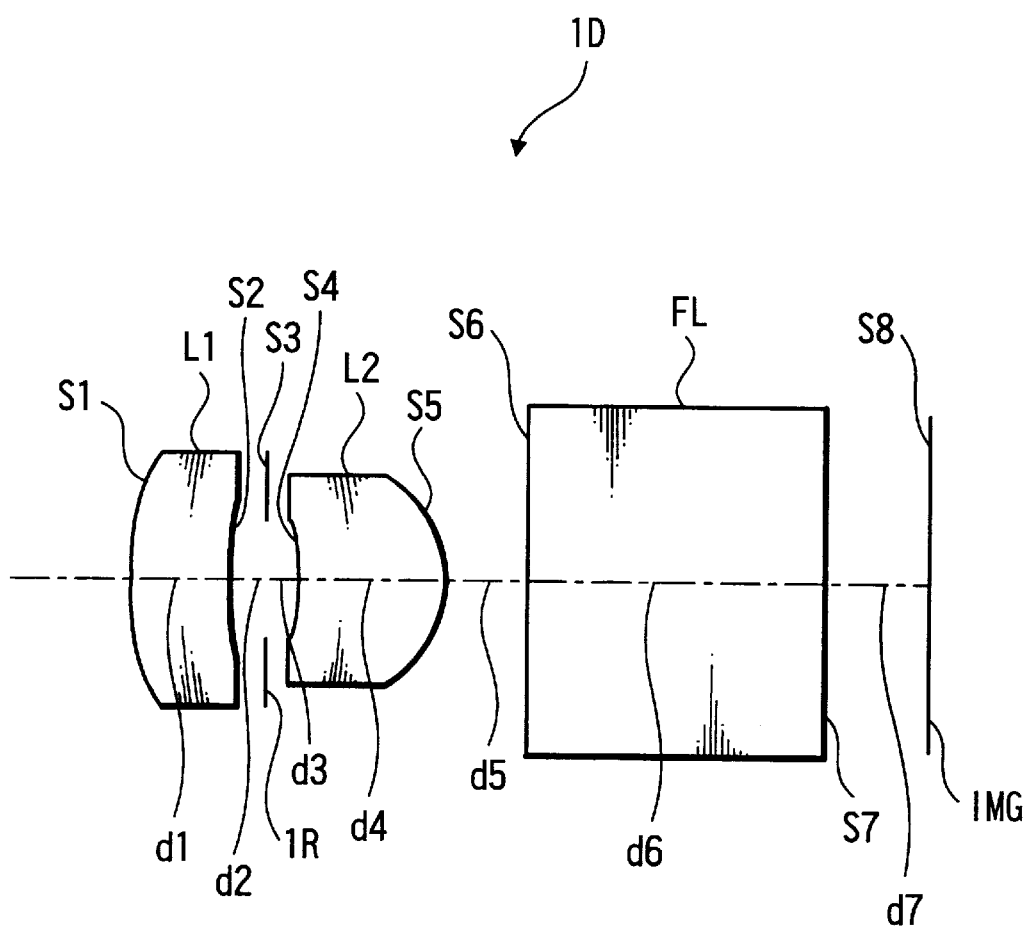
FIG. 17 is a diagram schematically showing, together with FIGS. 18 to 20, an imaging lens according to a fifth embodiment of the invention, the diagram schematically showing a lens configuration.

FIGS. 14 to 16 show a spherical aberration diagram, an astigmatism diagram and a distortion diagram for the imaging lens 1C. Also, in the spherical aberration diagram, the solid line represents the value for the e line, the dashed line the value for the C line, and the one-dot chain line the value for the g line. In the astigmatism diagram, the solid line represents the value for the sagittal image surface, and dashed line the value for the meridional image surface.

Table 13 shows the values for the imaging lens 1D according to the fifth embodiment.

TABLE 13

| i | Ri | di | ndi | vdi |
|---|------|------|---------|------|
| 1 | 4.014 | 0.70 | 1.80610 | 40.9 |
| 2 | 5.875 | 0.26 | | |
| 3 | stop | 0.18 | | |
| 4 | −1.644 | 1.07 | 1.58913 | 61.2 |
| 5 | −1.050 | 0.63 | | |

TABLE 13-continued

| i | Ri | di | ndi | vdi |
|---|----|----|-----|-----|
| 6 | ∞ | 2.34 | 1.51680 | 64.2 |
| 7 | ∞ | 0.72 | | |
| 8 | Image surface | | | |

Table 14 shows the fourth-, sixth-, eighth- and tenth-order non-spherical coefficients A4, A6, A8 and A10 for the faces S1, S2, S4 and S5, respectively, configured of a non-spherical surface.

TABLE 14

| Si | K | A4 | A6 | A8 | A10 |
|----|---|----|----|----|-----|
| S1 | 0 | 6.6977E−02 | −4.30707E−02 | 7.51205E−02 | −4.0747E−02 |
| S2 | 0 | 1.41687E−01 | −2.10835E−01 | 5.29713E−01 | −7.50323E−D1 |
| S4 | 0 | −2.46256E−01 | 9.27029E−01 | −6.41748 | 1.07157E+01 |
| S5 | 0 | 2.98176E−02 | −6.02561E−02 | 3.77810E−01 | −4.94721E−01 |

Table 15 shows the value of each conditional equation and the values f, Fno. and ω for the imaging lens 1D.

TABLE 15

| f2/f | 1.05 |
|------|------|
| nd2 | 1.58913 |
| |f1/f| | 3.8 |
| d1/f | 0.250 |
| |exp/l| | 0.781 |
| f | 2.80 |
| Fno. | 2.83 |
| ω | 28.6 |

Figure 18:
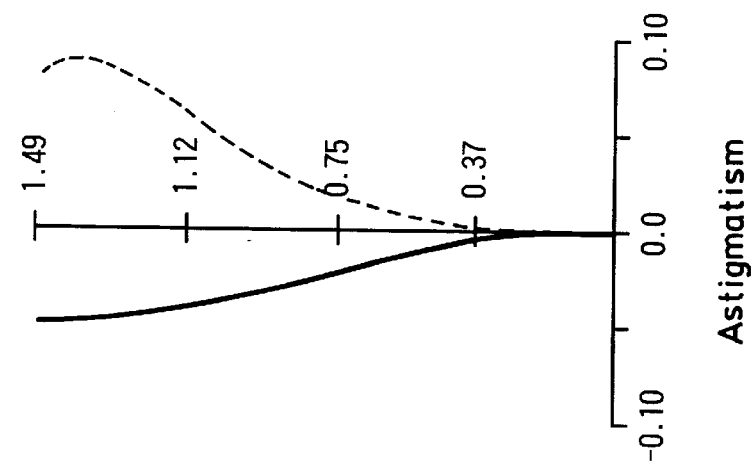
FIG. 18 is a spherical aberration diagram.
Figure 19:
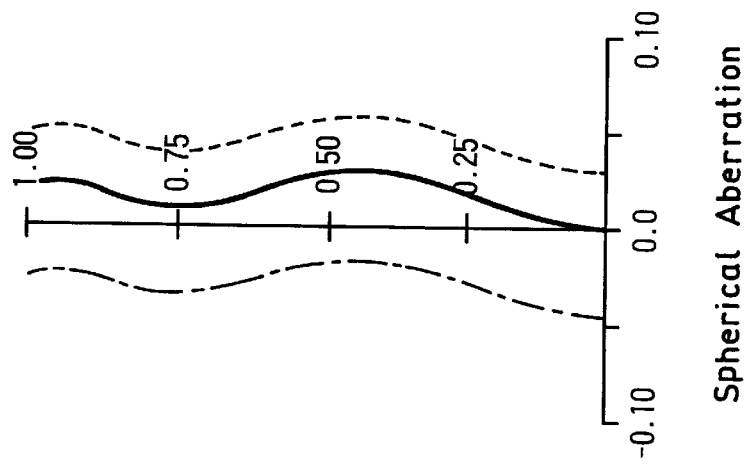
FIG. 19 is an astigmatism diagram.
Figure 20:
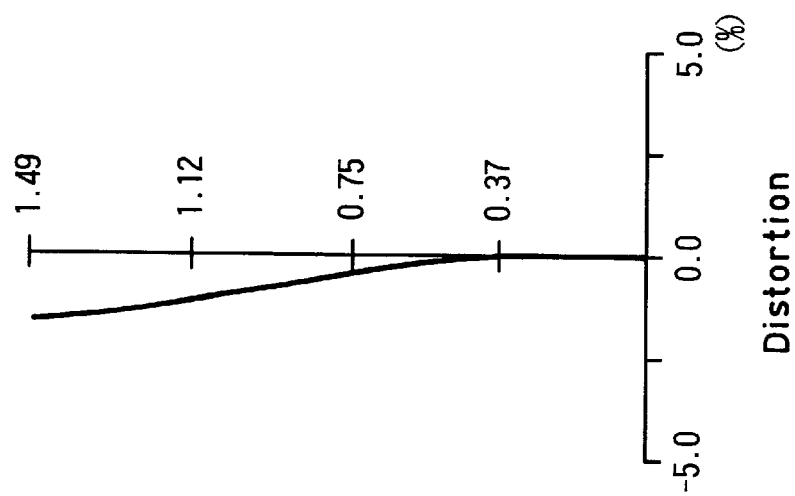
FIG. 20 is a distortion diagram.

FIGS. 18 to 20 show a spherical aberration diagram, an astigmatism diagram and a distortion diagram for the imaging lens 1D. Also, in the spherical aberration diagram, the solid line represents the value for the e line, the dashed line the value for the C line, and the one-dot chain line the value for the g line. In the astigmatism diagram, the solid line represents the value for the sagittal image surface, and the dashed line the value for the meridional image surface, respectively.

Figure 21:
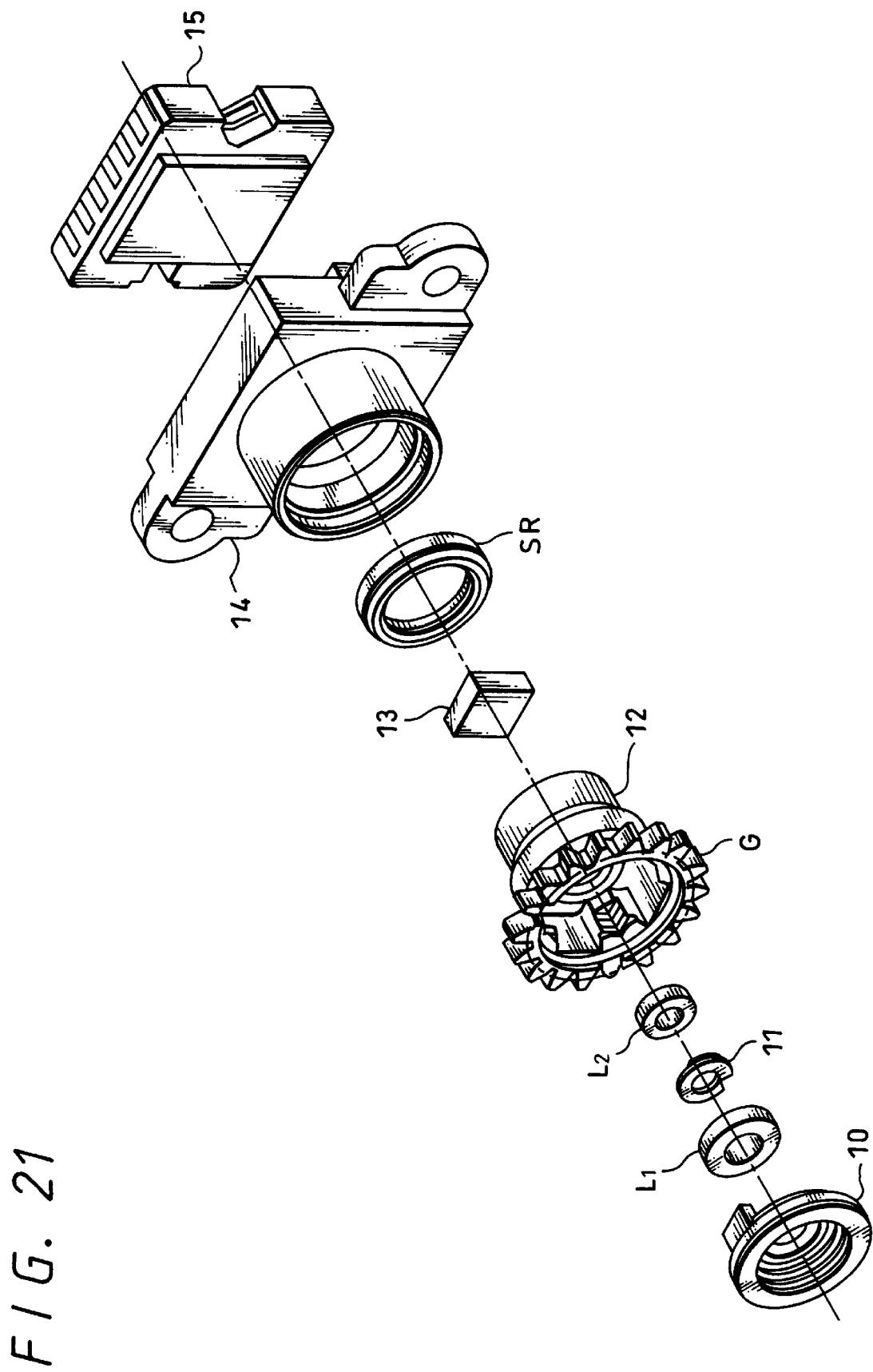
FIG. 21 is an exploded perspective view of an imaging lens according to the invention and parts for attaching the imaging lens to a CCD.
Figure 22:
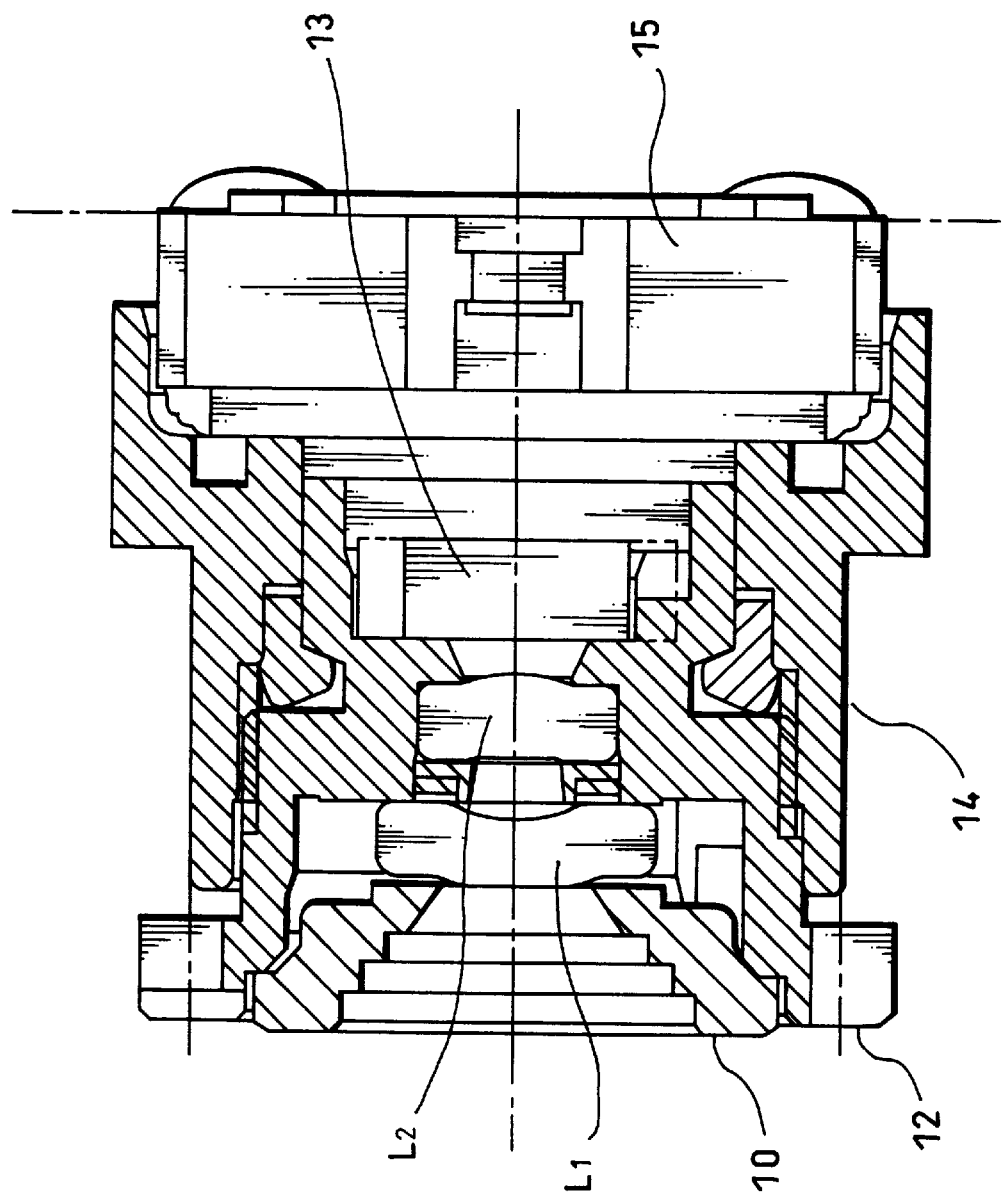
FIG. 22 is a partially cross-sectional view of the imaging lens attached to the CCD shown in FIG. 21.

FIGS. 21, 22 show an assembly in the case where an imaging lens according to this invention is mounted on a CCD 15 using a decorative panel 10, a light shield plate 11, a lens barrel 12, an IR filter 13 and a CCD holder 14.

The lens barrel 12 has an inner peripheral portion on which a plurality of peripheral surfaces of different diameters are arranged coaxially. Within the plurality of peripheral surfaces, the first lens, the light shield plate and the second lens are fixed with the distance fixed between the optical component parts. Especially, the first lens L1 and the second lens L2 are each comprised of a mold lens, and the first lens is mounted by pressure fitting and bonding. The second lens is press-fitted into the lens barrel 12. According to this invention, the characteristics of the first and second lenses are determined as described above thereby to reduce the sensitivity to the lens eccentricity. Thus the assembling accuracy can be relaxed. Further, actual optical component parts can be mounted with high accuracy by means of the press-fitting technique. By the way, the first lens and the second lens have the diameter of about 2 to 3.5 mm.

A spiral is formed along the outer peripheral surface of the lens barrel 12, which is screwed to the spiral formed on the interior of the cylinder of the CCD holder 14 thereby to change the distance between the lens barrel 12 and the CCD 15 mounted on the holder 14.

In this case, the distance between the solid imaging device of t he imaging lens and the side surface of the first lens near to the object in this invention can be changed thereby to adjust the focus. The distance involved is larger than the design value described above but can be made 7 mm or less.

A sealing SR is provided for the purpose of blocking the outflow of the grease coated between the spiral portions onto the CCD. The CCD holder 14 and the CCD 15 are bonded with adhesive.

The outer peripheral surface of the lens barrel 12 near to the object shown in FIG. 21 is further provided with a gear.

Figure 23:
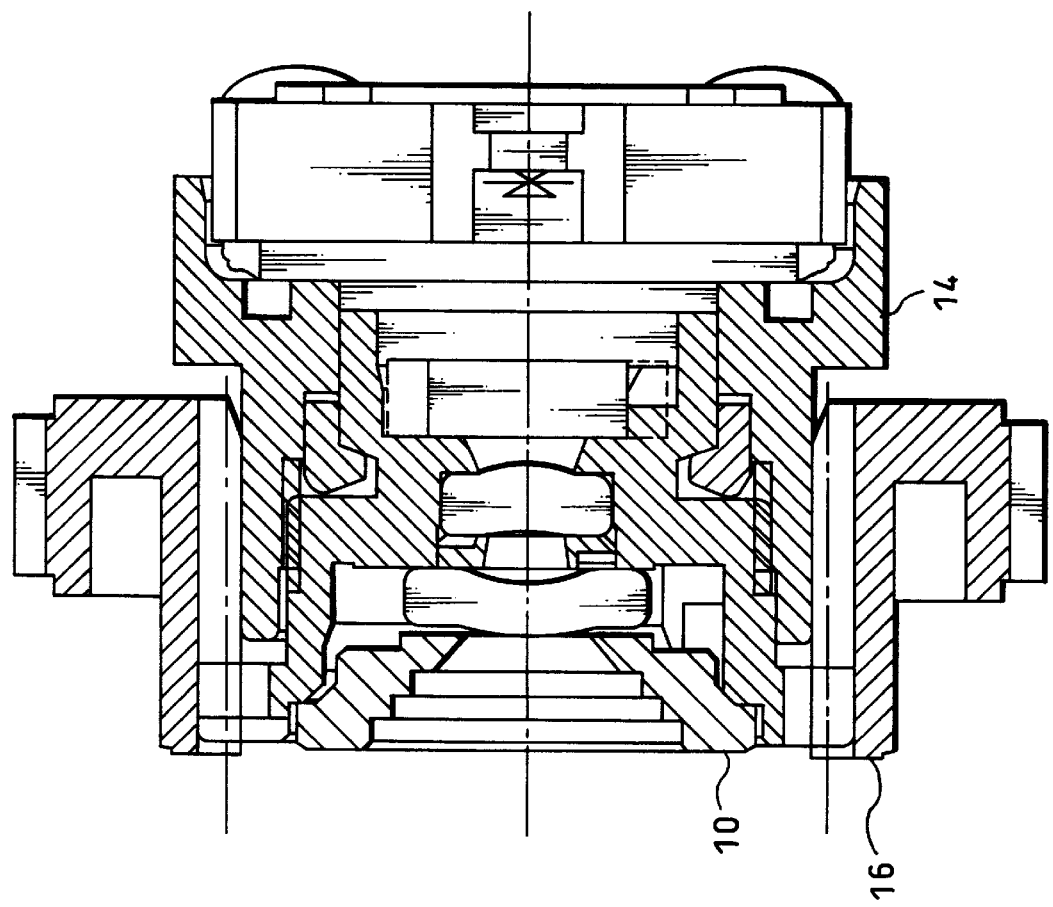
FIG. 23 is a partially cross-sectional view showing the state that the assembled imaging lens shown in FIG. 22 is covered by a cylindrical member.

As shown in FIG. 23, a member 16 is provided which is fitted on the exterior of the cylinder of the CCD holder 14 and has a substantially cylindrical shape with the rotational angle thereof limited.

This cylindrical member 16 has arranged therein a gear G in mesh with the gear of the lens barrel 12 so that the screwed position between the barrel 12 and the CCD holder 14 may be adjusted. The rotational range of the member 16 is restricted, and thus the screwed position between the lens barrel 12 and the CCD holder 14 is restricted within this rotational range. The member 16 is used for adjusting the focus.

As described above, with the imaging lens according to the present invention, the distortion and the coma flare can be corrected satisfactorily by the non-spherical surface of the first lens L1. Thus the reduction in the optical performance due to the eccentricity of the lens can be suppressed. Thus it is possible to produce a small-sized lens system configured of two lenses with an improved assembling property by reducing the sensitivity to the lens eccentricity and thus relaxing the accuracy of the component parts.

By the way, a specific shape and structure of each part shown in each of the embodiments described above is only an example of embodying the present invention and the technical scope of this invention must never be interpreted limitatively from these embodiments.

As is clear from the foregoing description, the imaging lens according to this invention is configured of, from the object side toward the image surface side, a first lens in the shape of meniscus having a weak refracting power and a second lens in the shape of meniscus having a positive refracting power with the convex surface thereof directed toward the image surface side, and can meet the conditions defined by f2/f>0.9 and nd2>1.55, where f is the focal length of the whole lens system, f2 the focal length of the second lens, and nd2 the refractive index on the d line of the second lens. In this way, a small-sized imaging lens unit having the distortion thereof corrected satisfactorily can be configured of two lenses.

Also, according to this invention described in claim 2, the conditions |f1/f|>3.5, 0.2<d1/f<0.35 and 0.65<|exp/l| can be met, where f1 is the focal length of the first lens, d1 the thickness of the central portion of the first lens, exp the distance from the image surface to the exit pupil and l the distance from the top of the surface of the first lens near to the object side to the image surface (converted in the air except for the filter). Thus, the optical performance is not deteriorated by the lens eccentricity, and therefore the sensitivity to the lens eccentricity can be set lower. As a result, the assembling property for the imaging lens can be improved by relaxing the accuracy of the lens parts.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An imaging lens comprising, arranged from an object toward the image surface:

a first lens in the shape of meniscus having a progressively weak refracting power; and a second lens in the shape of meniscus having a positive refracting power and having the convex surface thereof directed toward the image surface side, wherein the following conditions are satisfied;

$$f2/f>0.9$$

$$nd2>1.55$$

where f: focal length of whole lens system, f2: focal length of second lens, and nd2: refractive index of second lens along d line (wavelength of 587.6 nm).

2. An imaging lens according to claim 1, wherein the following conditions are satisfied;

$$|f1/f|>3.5$$

$$0.2<d1/f<0.35$$

$$0.65<|exp/l|$$

where f1: focal length of first lens, d1: thickness of central portion of first lens, exp: distance from image surface to exit pupil, l: distance from top of surface of first lens near to object side to image surface (converted in air except for filter).

3. A lens system of a two lens type for a solid imaging device comprising:

a first lens substantially in the shape of a meniscus and having a progressively weaker refracting power on an object side of said lens system, and a second lens substantially in the shape of a meniscus on a side of said first lens of said lens system closer to an imaging plane of said solid imaging device than said first lens, wherein the distance on the optical axis between the imaging plane and a surface of the first lens nearest the object is set equal to or less than 7 mm.

4. The lens system according to claim 3, wherein the distance on the optical axis between the imaging plane and a side of the second lens nearest to send imaging plane is set equal to or more than 3.5 mm.

5. A lens system for a solid imaging device comprising:

a first lens substantially in the shape of meniscus on an object side, and a second lens on a solid imaging device side and a solid imaging device, wherein the distance on the optical axis between the solid imaging device and the surface of the first lens near to the object is set equal to or less 7 mm, and wherein the refractive index of the second lens is set equal to or more than 1.55, the ratio between the focal length of the second lens and the focal length of the whole lens system is set equal to or more than 0.9, and the interval on the optical axis between the side of the second lens near to the solid imaging device and the solid imaging device is set equal to or more than 3.5 mm.

6. A lens system for a solid imaging device, comprising:

a first lens substantially in the shape of a meniscus on an object side of said lens system; and a second lens substantially in the shape of a meniscus on a side of said first lens of said lens system closer to an imaging plane of said solid imaging device than said first lens;

wherein a refractive index of said second lens is equal to or more than 1.55 mm and the ratio between the focal length of the second lens and the focal length of the lens system is set equal to or more than 0.9 mm.

* * * * *